(12) United States Patent
Kim et al.

(10) Patent No.: US 11,807,922 B2
(45) Date of Patent: *Nov. 7, 2023

(54) ELECTRICAL STEEL SHEET ADHESIVE COATING COMPOSITION, ELECTRICAL STEEL SHEET PRODUCT, AND MANUFACTURING METHOD THEREFOR

(71) Applicant: POSCO, Pohang-si (KR)

(72) Inventors: Jung-Woo Kim, Pohang-si (KR); Bongwoo Ha, Pohang-si (KR); Taeyoung No, Pohang-si (KR); Won-Seog Bong, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 768 days.

This patent is subject to a terminal disclaimer.

(21) Appl. No.: 16/473,047

(22) PCT Filed: Dec. 21, 2017

(86) PCT No.: PCT/KR2017/015202
§ 371 (c)(1),
(2) Date: Jun. 24, 2019

(87) PCT Pub. No.: WO2018/117670
PCT Pub. Date: Jun. 28, 2018

(65) Prior Publication Data
US 2020/0087760 A1    Mar. 19, 2020

(30) Foreign Application Priority Data

Dec. 23, 2016   (KR) ......................... 10-2016-0178484

(51) Int. Cl.
| | | |
|---|---|---|
| *C22C 38/02* | (2006.01) | |
| *B05D 3/02* | (2006.01) | |
| *B05D 7/14* | (2006.01) | |
| *C08K 3/08* | (2006.01) | |
| *C08K 3/22* | (2006.01) | |
| *C09J 5/06* | (2006.01) | |
| *C09J 11/04* | (2006.01) | |
| *C09J 11/08* | (2006.01) | |

(52) U.S. Cl.
CPC ............ *C22C 38/02* (2013.01); *B05D 3/0254* (2013.01); *B05D 7/14* (2013.01); *C08K 3/08* (2013.01); *C08K 3/22* (2013.01); *C09J 5/06* (2013.01); *C09J 11/04* (2013.01); *C09J 11/08* (2013.01)

(58) Field of Classification Search
None
See application file for complete search history.

(56) References Cited

U.S. PATENT DOCUMENTS

| | | |
|---|---|---|
| 9,187,830 B2 | 11/2015 | Yamazaki et al. |
| 2009/0324837 A1 | 12/2009 | Han et al. |
| 2013/0115443 A1 | 6/2013 | Takeda et al. |
| 2013/0209789 A1 | 8/2013 | Takeda et al. |
| 2015/0017428 A1 | 1/2015 | Kim et al. |
| 2015/0337141 A1 | 11/2015 | Pedoni et al. |
| 2016/0375658 A1 | 12/2016 | Kim et al. |
| 2018/0122573 A1 | 5/2018 | Fluch et al. |
| 2019/0160786 A1* | 5/2019 | Nakagawa ............... B32B 27/38 |

FOREIGN PATENT DOCUMENTS

| | | |
|---|---|---|
| CN | 101040022 A | 9/2007 |
| CN | 102782185 A | 11/2012 |
| CN | 104025207 A | 9/2014 |
| CN | 105086818 A | 11/2015 |
| CN | 105765106 A | 7/2016 |
| EP | 2800103 A1 | 11/2014 |
| EP | 3075882 A1 | 10/2016 |
| JP | H07-201551 A | 4/1995 |
| JP | 2000-030923 A | 1/2000 |
| JP | 2009-545674 A | 12/2009 |
| JP | 4460312 B2 | 5/2010 |
| JP | 4571838 B2 | 10/2010 |
| JP | 2012-001807 A | 1/2012 |
| JP | 2012-046825 A | 3/2012 |
| JP | 5073853 B2 | 11/2012 |
| JP | 5494602 B2 | 5/2014 |
| JP | 2015-509994 A | 4/2015 |
| JP | 2015-206092 A | 11/2015 |
| JP | 2016-540901 A | 12/2016 |

(Continued)

OTHER PUBLICATIONS

Japanese Office Action dated Oct. 26, 2021, issued in corresponding Japanese Patent Application No. 2020-176648.

(Continued)

*Primary Examiner* — Robert T Butcher
(74) *Attorney, Agent, or Firm* — Morgan, Lewis & Bockius LLP

(57) ABSTRACT

An embodiment of the present invention provides: an adhesive coating composition capable of attaching (coupling) an electrical steel sheet without using an existing coupling method, such as welding, clamping, or interlocking; an electrical steel sheet laminate employing the same; and a manufacturing method therefor. The adhesive coating composition according to an embodiment of the present invention comprises: 40-95 wt % of a first component comprising an organic/inorganic composite in which inorganic nanoparticles are substituted in a water-soluble resin; 1-50 wt % of a second component comprising a composite metal phosphate; and 1-10 wt % of an additive.

7 Claims, 23 Drawing Sheets

(56) References Cited

FOREIGN PATENT DOCUMENTS

| | | |
|---|---|---|
| JP | 2018-504516 A | 2/2018 |
| JP | 2018-518591 A | 7/2018 |
| JP | 2019-508573 A | 3/2019 |
| KR | 10-0411279 B1 | 12/2003 |
| KR | 10-0886236 B1 | 3/2009 |
| KR | 10-2013-0076642 A | 7/2013 |
| KR | 10-2014-0060717 A | 5/2014 |
| KR | 10-1448598 B1 | 10/2014 |
| KR | 10-2015-0061472 A | 6/2015 |
| KR | 10-2015-0074817 A | 7/2015 |
| KR | 10-1728027 B1 | 4/2017 |
| KR | 10-2017-0074110 A | 6/2017 |
| KR | 10-2017-0075527 A | 7/2017 |
| WO | 2015/080463 A1 | 6/2015 |

OTHER PUBLICATIONS

International Search Report and Written Opinion dated May 31, 2018 issued in International Patent Application No. PCT/KR2017/015202 (with partial English translation).
European Search Report dated Apr. 23, 2020 issued in European Patent Application No. 17883111.1.
Chinese Search Report dated May 21, 2020 issued in Chinese Patent Application No. 2017800802362.
Indian Office Action dated Jul. 17, 2020 issued in Indian Patent Application No. 201947029238 (with English translation).
Japanese Office Action dated Jul. 21, 2020 issued in Japanese Patent Application No. 2019-534738.
Partial Supplementary European Search Report issued in European Patent Application No. 17883111.1, dated Dec. 16, 2019.
Korean Office Action dated Oct. 29, 2020 issued in Korean Patent Application No. 10-2019-7021311.
Chinese Search Report dated Nov. 10, 2020 issued in Chinese Patent Application No. 201780080236.2.

\* cited by examiner ical steel sheet adhesive coating composition, electrical steel sheet product, and manufacturing method therefor

ELECTRICAL STEEL SHEET ADHESIVE COATING COMPOSITION, ELECTRICAL STEEL SHEET PRODUCT, AND MANUFACTURING METHOD THEREFOR

CROSS-REFERENCE OF RELATED APPLICATIONS

This application is the U.S. National Phase under 35 U.S.C. § 371 of International Patent Application No. PCT/KR2017/015202, filed on Dec. 21, 2017, which in turn claims the benefit of Korean Application No. 10-2016-0178484, filed on Dec. 23, 2016, the entire disclosures of which applications are incorporated by reference herein.

TECHNICAL FIELD

The present invention relates to an electrical steel sheet adhesive coating composition, an electrical steel sheet product, and a manufacturing method thereof.

BACKGROUND ART

A non-oriented electrical steel sheet is a steel sheet of which a magnetic characteristic is uniform in all directions on a rolling plate, and it is widely used for a motor, a steel core of a generator, an electric motor, and a small transformer.

The electrical steel sheet may be classified into two types, including a type undergoing stress relief annealing (SRA) so as to improve a magnetic characteristic after punching processing, and a type in which stress relief annealing is omitted when a cost of a heat treatment is greater than an effect of the magnetic characteristic caused by the stress relief annealing.

An insulation film is a film coated in a final manufacturing process for a motor, a steel core of a generator, an electric motor, or a small transformer, and it conventionally requires an electrical characteristic of suppressing generation of an eddy current. In addition, continuous punching workability, sticking resistance, and a surface close contacting property are required. The continuous punching workability signifies the ability for suppressing abrasion of a mold when a punching process is performed with a predetermined shape and a plurality of units are stacked to make a steel core. The sticking resistance signifies the ability of not allowing steel sheets of iron cores to be adhered to each other after a stress relief annealing process for recovering the magnetic characteristic by eliminating a processing stress of the steel sheet.

In addition to the basic characteristics, excellent coating workability of a coating solution and stability of a solution to be usable for a long time after mixing are required. The insulating film may be manufactured to be an electrical steel sheet product when an additional coupling method such as welding, clamping, or interlocking is performed.

On the contrary, there has been an attempt to perform coupling by thermal fusion of an adhesive solution coated on an electrical steel surface without using the existing coupling method such as welding, clamping, or interlocking. A major component of an adhesive coating developed for this purpose is an organic material.

However, in the stress relief annealing process, the organic material is decomposed at a high temperature, so surface characteristics (e.g., insulation, attachment, and corrosion resistance) of an organic adhesive coating composition is deteriorated, and adherence (or coupling strength) among the respective electrical steel sheets is mostly lost.

DISCLOSURE

The present invention has been made in an effort to provide an adhesive coating composition for attaching (coupling) an electrical steel sheet without using an existing coupling method such as welding, clamping, or interlocking, an electrical steel sheet product to which the same is applied, and a manufacturing method thereof.

The present invention has been made in another effort to provide an adhesive coating composition for maintaining bonding strength after stress relief annealing process, an electrical steel sheet product to which the same is applied, and a manufacturing method thereof.

An exemplary embodiment of the present invention provides an electrical steel sheet adhesive coating composition including, with reference to an entire solid of 100 wt %: 10 to 50 wt % of a resin including an aromatic hydrocarbon; 5 to 40 wt % of an organic/inorganic composite with inorganic nanoparticles substituted for the resin including an aromatic hydrocarbon; 10 to 30 wt % of a composite metal phosphate; 5 to 50 wt % of phosphoric acid; and 1 to 15 wt % of a cohesion reinforcing agent.

The aromatic hydrocarbon may include at least one of benzene, toluene, xylene, naphthalene, anthracene, and benzopyrene.

The resin including an aromatic hydrocarbon may include at least one of an epoxy-based resin, a siloxane-based resin, an acryl-based resin, a phenol-based resin, a styrene-based resin, a vinyl-based resin, an ethylene-based resin, and a urethane-based resin.

The resin including an aromatic hydrocarbon may have a weight average molecular weight of 1000 to 100,000 and a softening point (Tg) of 30 to 150° C.

The inorganic nanoparticles may include at least one of $SiO_2$, $Al_2O_3$, $TiO_2$, MgO, ZnO, CaO, and $ZrO_2$.

The inorganic nanoparticles may be substituted in the organic/inorganic composite at 10 to 50 wt %.

The composite metal phosphate may include at least one of a first aluminum phosphate ($Al(H_3PO_4)_3$), a first cobalt phosphate ($Co(H_3PO_4)_2$), a first calcium phosphate ($Ca(H_3PO_4)_2$), a first zinc phosphate ($Zn(H_3PO_4)_2$), and a first magnesium phosphate ($Mg(H_3PO_4)_2$).

The cohesion reinforcing agent may include at least one of an oxide, a hydroxide, carbon nanotubes (CNT), carbon black, a pigment, and a coupling agent.

Another embodiment of the present invention provides an electrical steel sheet laminate including: a plurality of electrical steel sheets; and a thermal fusion layer provided between the plurality of electrical steel sheets, wherein the thermal fusion layer includes 10 to 50 wt % of a resin including an aromatic hydrocarbon, 5 to 40 wt % of an organic/inorganic composite with inorganic nanoparticles substituted to the resin including an aromatic hydrocarbon, 10 to 30 wt % of a composite metal phosphate, 5 to 50 wt % of a phosphoric acid, and 1 to 15 wt % of a cohesion reinforcing agent.

Yet another embodiment of the present invention provides an electrical steel sheet product including: a plurality of electrical steel sheets; and an adhesive layer provided between the plurality of electrical steel sheets, wherein the adhesive layer includes 10 to 30 wt % of P, 10 to 30 wt % of at least one metal of Si, Ti, Zr, Al, Co, Ca, Zn, and Mg, 1 to 10 wt % of N, 1 to 10 wt % of C, and O as a balance.

The adhesive layer may include 50 to 90 wt % of an inorganic material.

The adhesive layer may further include 1 to 20 wt % of at least one of Cu, Cr, Fe, B, Si, Na, and K.

The adhesive layer may include a carbide, a nitride, or an oxide of P, and a carbide, a nitride, or an oxide of at least one metal selected from among Al, Co, Ca, Zn, and Mg.

Regarding a cross-sectional area of the adhesive layer, an area fraction of the adhesive layer having formed an aggregated body with a particle diameter that is equal to or greater than 30 nm when the inorganic components of the adhesive layer are aggregated with each other may be equal to or less than 0.1.

The adhesive layer may have the fraction of the area occupied by a pore, that is equal to or less than 0.5 with respect to a cross-sectional area of the adhesive layer.

A thickness of the adhesive layer may be 0.5 to 25 μm.

Hardness of the adhesive layer may be equal to or greater than 5 with reference to Rockwell hardness.

The electrical steel sheet product may further include an oxidation layer provided between the electrical steel and the adhesive layer.

The oxidation layer may include 10 to 30 wt % of P, 10 to 30 wt % of at least one type of metal selected from among Si, Ti, Zr, Al, Co, Ca, Zn, and Mg, and O as a balance.

A thickness of the oxidation layer may be 10 to 500 nm.

Hardness of the adhesive layer may be equal to or greater than 20 with reference to the Rockwell hardness.

An area fraction of an oxide produced within 10 μm in an internal direction of an electrical steel sheet from an interface of the oxidation layer and the electrical steel may be equal to or less than 0.05.

An average particle diameter of an oxide produced within 10 μm in an internal direction of the electrical steel sheet from an interface of the oxidation layer and the electrical steel may be 0.01 to 5 μm.

Yet another embodiment of the present invention provides a method for manufacturing an electrical steel sheet product, including: a step for preparing an adhesive coating composition; a step for coating the adhesive coating composition on a surface of an electrical steel sheet and hardening the same to form an adhesive coating layer; a step for stacking a plurality of electrical steel sheets on which the adhesive coating layer is formed, and performing thermal fusion to the same to form a thermal fusion layer; and a step for applying stress relief annealing to the thermally fused electrical steel sheet laminate to form an adhesive layer.

The step for forming an adhesive coating layer may be performed at a temperature range of 200 to 600° C.

The step for forming a thermal fusion layer may include performing a thermal fusion at a temperature of 150 to 300° C., with a pressure of 0.5 to 5.0 MPa, and in a pressurizing condition of 0.1 to 120 minutes.

A shrinkage rate of the thermal fusion layer may be equal to or less than 0.1%. (Here, the shrinkage rate is calculated as ([a thickness of the adhesive coating layer before the step for forming a thermal fusion layer]-[a thickness of the thermal fusion layer after the step for forming a thermal fusion layer])/[a thickness of the adhesive coating layer before the step for forming a thermal fusion layer]).

The step for forming an adhesive layer may be performed for 30 to 180 minutes at the temperature of 500 to 900° C.

The step for forming an adhesive layer may be performed in a modified gas or nitrogen ($N_2$) gas atmosphere.

The step for forming an adhesive layer may be performed in a modified gas atmosphere including 10 to 30 vol % of liquefied natural gas (LNG) and 70 to 90 vol % of air.

The step for forming an adhesive layer may include further producing an oxidation layer between the adhesive layer and the electrical steel sheet.

According to the exemplary embodiments of the present invention, the oil resistance, the close contacting property, the corrosion resistance, and the insulation property of the adhesive coating layer are improved, and adherence, scratch resistance, weather resistance, weldability, and high-temperature oil resistance may be improved in attaching different electrical steel sheets.

According to the exemplary embodiments of the present invention, the electrical steel sheets may be attached without using the existing couple method such as welding, clamping, and interlocking, so the magnetic property of the electrical steel sheet product is further excellent.

MODE FOR INVENTION

Figure 1:
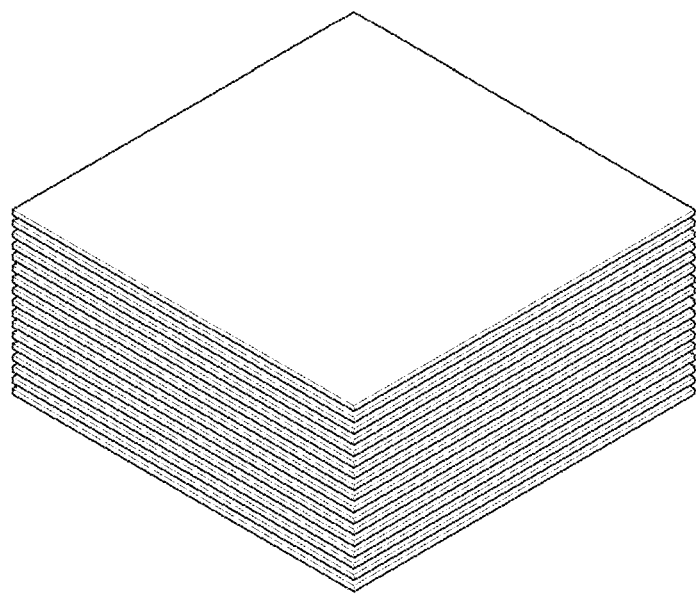
FIG. 1 shows a schematic view of an electrical steel sheet product.

It will be understood that, although the terms first, second, third, etc. may be used herein to describe various elements, components, regions, layers, and/or sections, they are not limited thereto. These terms are only used to distinguish one element, component, region, layer, or section from another element, component, region, layer, or section. Thus, a first element, component, region, layer, or section discussed below could be termed a second element, component, region, layer, or section without departing from the teachings of the present invention.

The technical terms used herein are to simply mention a particular exemplary embodiment and are not meant to limit the present invention. An expression used in the singular encompasses an expression of the plural, unless it has a clearly different meaning in the context. In the specification, it is to be understood that terms such as "including", "having", etc., are intended to indicate the existence of specific features, regions, numbers, stages, operations, elements, components, or combinations thereof disclosed in the specification, and are not intended to preclude the possibility that one or more other specific features, regions, numbers, operations, elements, components, or combinations thereof may exist or may be added.

When a part is referred to as being "on" another part, it can be directly on the other part or intervening parts may also be present. In contrast, when an element is referred to as being "directly on" another element, there are no intervening elements therebetween.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the same meanings as contextual meanings in the relevant field of art, and are not to be interpreted to have idealized or excessively formal meanings unless clearly defined in the present application.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In an exemplary embodiment of the present invention, an electrical steel sheet adhesive coating composition, an electrical steel sheet laminate, an electrical steel sheet product, and a manufacturing method thereof will now be described.

The electrical steel sheet adhesive coating composition according to an exemplary embodiment of the present invention includes: a resin at 10 to 50 wt % including an aromatic hydrocarbon; an organic/inorganic composite at 5 to 40 wt % in which inorganic nanoparticles are substituted for the resin including an aromatic hydrocarbon; a composite metal phosphate at 10 to 30 wt %; a phosphoric acid at 5 to 50 wt %; and a cohesion reinforcing agent at 1 to 15 wt % with reference to an entire solid of 100 wt %. The electrical steel sheet adhesive coating composition according to an exemplary embodiment of the present invention allows attaching (or coupling) of the electrical steel without using the existing coupling method such as welding, clamping, or interlocking. Further, the bonding strength may be maintained after the stress relief annealing process. In an exemplary embodiment of the present invention, the electrical steel is a non-oriented or oriented electrical steel, and in detail, it may be a non-oriented electrical steel.

Respective components will now be described in detail.

The resin including an aromatic hydrocarbon forms a thermal fusion layer at a time of thermal fusion to be described, and it is provided between the electrical steel sheets to apply adherence between the electrical steel sheets. When the thermal fusion layer fails to appropriately apply adherence between the electrical steel sheets, a plurality of precisely attached electrical steel sheets are misaligned during the process performance. When a stacking position is misaligned, it provides a bad influence to quality of the finally manufactured electrical steel sheet product. After the thermal fusion by the resin including an aromatic hydrocarbon, adherence is acquired, so the position of the stacked electrical steel sheets may not be misaligned.

The resin including an aromatic hydrocarbon is partly decomposed in a stress relief annealing step to be described, and it partly remains, thereby imparting adherence between the electrical steel sheets. In this instance, the aromatic hydrocarbon is not thermally decomposed at a high temperature, and it maintains adherence after the stress relief annealing process. On the contrary, in the case of the resin including no aromatic hydrocarbon, it is thermally decomposed in the stress relief annealing step, and adherence may be deteriorated.

The resin including an aromatic hydrocarbon signifies a resin with a main chain and/or a side chain including an aromatic hydrocarbon. In detail, the aromatic hydrocarbon may include at least one of benzene, toluene, xylene, naphthalene, anthracene, and benzopyrene.

The resin may, in detail, include at least one of an epoxy-based resin, a siloxane-based resin, an acryl-based resin, a phenol-based resin, a styrene-based resin, a vinyl-based resin, an ethylene-based resin, and a urethane-based resin. In this instance, heat resistance of the thermal fusion layer and the adhesive layer may be improved by selecting one or two mixtures of the above-exemplified resins. In other words, the resin including an aromatic hydrocarbon helps to improve insulation, heat resistance, and surface characteristics of the thermal fusion layer and the adhesive layer.

The resin including an aromatic hydrocarbon may have a weight average molecular weight of 1000 to 100,000, and a number average molecular weight of 1000 to 40,000. In relation to the weight average molecular weight and the number average molecular weight, in the case of being less than the lower limit, physical properties of the adhesive coating layer such as hardening or rigidity may be deteriorated, and in the case of being greater than the upper limit, phase separation may be generated in the water-soluble resin, and compatibility with the composite metal phosphate may be worsened. In further detail, the resin including an aromatic hydrocarbon may have a weight average molecular weight of 5000 to 30,000.

Further, a softening point (Tg) of the water-soluble resin may be 30 to 150° C., and a solid fraction (a content of a solid) may be 10 to 50 wt %. If the softening point (Tg) of the water-soluble resin is greater than 120° C., viscosity of the composition increases very much, and coating workability may be deteriorated.

10 to 50 wt % of the resin including an aromatic hydrocarbon is included with respect to the 100 wt % of the solid of the adhesive coating material. When a very small amount of the resin including an aromatic hydrocarbon is included, a drawback that appropriate adherence of the thermal fusion layer may not be acquired may occur. When a very large amount of the resin including an aromatic hydrocarbon is included, the resin including an aromatic hydrocarbon is partly decomposed in the stress relief annealing step, so a drawback that appropriate adherence of the adhesive layer may not be acquired may be generated. In further detail, 20 to 40 wt % of the resin including an aromatic hydrocarbon may be included with respect to the 100 wt % of the solid of the adhesive coating material.

The adhesive coating material includes an organic/inorganic composite in which inorganic nanoparticles are substituted for the resin including a hydrocarbon. As described above, the resin including an aromatic hydrocarbon is partly thermally decomposed in the stress relief annealing step, so it is difficult to acquire appropriate adherence of the adhesive layer with the resin including an aromatic hydrocarbon. To appropriately assign adherence of the adhesive layer, an organic/inorganic composite in which inorganic nanoparticles are substituted for the resin including a hydrocarbon is provided. The inorganic nanoparticles provide adherence of the adhesive layer after the stress relief annealing step. Further, precipitation or agglomeration of the composite metal phosphate is prevented, and excellent expression of the surface characteristic after the stress relief annealing is supported.

The resin including a hydrocarbon in the organic/inorganic composite corresponds to the description of the resin including a hydrocarbon as a component of the above-described adhesive coating material, so a repeated description will be omitted. The resin including a hydrocarbon as a component of the adhesive coating material and the resin including a hydrocarbon in the organic/inorganic composite may be of a same type. The inorganic nanoparticles are not substituted for the resin including a hydrocarbon but are added individually, the inorganic nanoparticles aggregate with each other, and no dispersion is performed.

In detail, the inorganic nanoparticles may include at least one of $SiO_2$, $Al_2O_3$, $TiO_2$, $MgO$, $ZnO$, $CaO$, and $ZrO_2$.

The inorganic nanoparticles may have an average particle size of 3 to 50 nm.

The inorganic nanoparticles may be substituted by 10 to 50 wt % in the organic/inorganic composite. That is, 10 to 50 wt % of the inorganic nanoparticles and 50 to 90 wt % of the resin including a hydrocarbon may be included, with respect to 100 wt % of the organic/inorganic composite. When the amount of the inorganic nanoparticles is very small, it may be difficult to appropriately acquire adherence of the adhesive layer after the stress relief annealing. When the amount of the inorganic nanoparticles is very large, the drawback of aggregation of inorganic nanoparticles may be generated.

The organic/inorganic composite may be included at 5 to 40 wt % with reference to 100 wt % of the solid of the adhesive coating material. When a very small amount of organic/inorganic composite is included, it may be difficult to acquire appropriate adherence of the adhesive layer after stress relief annealing. Further, a precipitation or agglomeration phenomenon of the composite metal phosphate may be generated. When a very large amount of organic/inorganic composite is included, a content of the resin including a hydrocarbon is relatively reduced, so it may be difficult to appropriately acquire the adherence of the thermal fusion layer. Further, a content of the composite metal phosphate is relatively reduced, and cohesion of the cohesion layer may be deteriorated. In further detail, the organic/inorganic composite may be included at 10 to 35 wt % with reference to 100 wt % of the solid of the adhesive coating material.

The adhesive coating material includes a composite metal phosphate.

A phosphate used in an exemplary embodiment of the present invention is expressed as a chemical formula of $M_x(H_3PO_4)_y$, and it will be referred to as a "composite metal phosphate" so as to distinguish the same from a metal phosphate expressed with the chemical formula of $M_x(PO_4)_y$.

The "composite metal phosphate" may be manufactured by reaction of phosphoric acid ($H_3PO_4$) and a metal hydroxide ($M_x(OH)_y$) or a metal oxide ($M_xO$), and detailed examples thereof include a first aluminum phosphate (Al($H_3PO_4$)$_3$), a first cobalt phosphate (Co($H_3PO_4$)$_2$), a first calcium phosphate (Ca($H_3PO_4$)$_2$), a first zinc phosphate (Zn($H_3PO_4$)$_2$), and a first magnesium phosphate (Mg($H_3PO_4$)$_2$) to be usable in an example to be described.

The composite metal phosphate supports high temperature adherence of the thermal fusion layer caused by thermal fusion, high temperature oil resistance, and an attaching characteristic of the adhesive layer after stress relief annealing. Since it includes the resin including a hydrocarbon and the organic/inorganic composite, the adhesive coating composition becomes an organic/inorganic mixed composition.

Although simply put previously, the composite metal phosphate is expressed in a chemical formula of $M_x(H_3PO_4)_y$, and it is distinguished from the metal phosphate expressed as the chemical formula of $M_x(PO_{4y})$. One, two, or more mixtures of the composite metal phosphate may be included in the second component.

Although simply put previously, the composite metal phosphate included in the second component may be manufactured by using a reaction of a metal hydroxide ($M_x(OH)_y$) or a metal oxide ($M_xO$), and phosphoric acid ($H_3PO_4$). For example, when a phosphoric acid aqueous solution including 85 wt % of free phosphoric acid ($H_3PO_4$) is set with reference to 100 parts by weight, a metal hydroxide ($M_x(OH)_y$) or a metal oxide ($M_xO$) are input, they are allowed to react for 6 to 10 hours at a temperature of 80 to 90° C., so respective composite metal phosphates may be obtained.

In this instance, an inputting amount of the metal hydroxide ($M_x(OH)_y$) or the metal oxide ($M_xO$) is 1 to 40 parts by weight in the case of aluminum hydroxide (Al(OH)$_3$), 1 to 10 parts by weight in the case of cobalt hydroxide (Co(OH)$_2$), 1 to 15 parts by weight in the case of calcium oxide (CaO), 1 to 20 parts by weight in the case of zinc oxide (ZnO), and 1 to 10 parts by weight in the case of magnesium oxide (MgO), with reference to 100 parts by weight of the phosphoric acid aqueous solution. When these ranges are satisfied, a balance of heat resistance and/or adherence may be maintained.

The composite metal phosphate may be included at 10 to 30 wt % with reference to 100 wt % of the solid of the adhesive coating material. When a very small amount of the composite metal phosphate is included, it may be difficult to appropriately acquire adherence of the adhesive layer after stress relief annealing. When a very large amount of the composite metal phosphate is included, adherence of the adhesive layer may be deteriorated because of aggregation between composite metal phosphates. In further detail, the composite metal phosphate may be included at 15 to 27 wt % with reference to 100 wt % of the solid of the adhesive coating material.

The phosphoric acid supports high temperature adherence of the thermal fusion layer caused by thermal fusion together with the composite metal phosphate, high temperature oil resistance, and an attaching characteristic of the adhesive layer after stress relief annealing.

The phosphoric acid may be included at 10 to 50 wt % with reference to 100 wt % of the solid of the adhesive coating material. When a very small amount of the phosphoric acid is included, it may be difficult to appropriately acquire adherence of the adhesive layer after stress relief annealing. The phosphoric acid has a property of absorbing moisture, so when a very large amount of the phosphoric acid is included, the adhesive coating composition may be aggregated by absorbing the moisture in the adhesive coating composition. By this, adherence of the adhesive layer may be deteriorated. In further detail, the phosphoric acid may be included at 12 to 35 wt % with reference to 100 wt % of the solid of the adhesive coating material.

The cohesion reinforcing agent supports maintaining the balance of heat resistance and/or adherence of the adhesive layer, and particularly it supports improvement of adherence after a stress relief annealing process.

The cohesion reinforcing agent includes at least one of an oxide, a hydroxide, carbon nanotubes (CNT), carbon black, a pigment, and a coupling agent.

In detail, at least one of copper oxide (CuO), aluminum oxide ($Al_2O_3$), calcium oxide (CaO), magnesium oxide (MgO), chromium oxide ($CrO_3$), iron oxide ($Fe_2O_3$), boric acid ($H_3BO_3$), phosphoric acid ($H_3PO_4$), zinc oxide (ZnO), and silica ($SiO_2$) may be the oxide. Particularly, the silica ($SiO_2$) may be colloidal silica with a particle diameter of 3 to 100 nm. In further detail, a content of $SiO_2$ in an aqueous solution may be 10 wt % to 50 wt %.

At least one of sodium hydroxide (NaOH), aluminum hydroxide ($Al(OH)_2$), magnesium hydroxide ($Mg(OH)_2$), calcium hydroxide ($Ca(OH)_2$), and potassium hydroxide (KOH) may be the hydroxide.

The carbon nanotubes (CNT) with a width direction diameter of 1 to 15 nm and a content of 1 to 20 wt % included in the aqueous solution may be used.

The carbon black with a particle diameter of 1 to 20 µm and a content of 5 wt % to 40 wt % included in the aqueous solution may be used.

The pigment of phthalocyanine-based blue and green and a particle diameter of 1 to 30 µm may be used.

The coupling agent may be a silane-based coupling agent, and in further detail, 3-glycidoxypropyltrimethoxysilane.

The cohesion reinforcing agent at 1 to 15 wt % may be included with respect to 100 wt % of the solid of the adhesive coating composition. When the above-described range is satisfied, a balance of heat resistance of the adhesive layer and/or adherence may be maintained, and particularly adherence after a stress relief annealing process may be superbly improved. When a content of the cohesion reinforcing agent is very small, adherence may be deteriorated after a stress relief annealing process. When a content of the cohesion reinforcing agent is very large, adherence may be deteriorated when thermal fusion is performed. In further detail, the cohesion reinforcing agent may be included at 3 to 12 wt %.

In addition to the above-noted component, the electrical steel sheet adhesive coating composition may include a solvent for easing coating and uniformly dispersing the components. The expression of the above-described solid excludes a volatilized portion including the solvent, and indicates the remaining solid.

An electrical steel sheet laminate according to an exemplary embodiment of the present invention includes: a plurality of electrical steel sheets; and a thermal fusion layer provided between a plurality of electrical steel sheets. In this instance, the thermal fusion layer represents a layer formed by coating the above-noted adhesive coating composition on the electrical steel surface and hardening the same to form an adhesive coating layer, and stacking the same to perform thermal fusion of the same. In the thermal fusion process, adherence is applied to the thermal fusion layer not by decomposing the resin but by hardening the resin in the adhesive coating composition. As described, the thermal fusion layer acquires appropriate adherence, thereby preventing positions of the stacked electrical steel sheets from being misaligned. In the thermal fusion process, a volatilized component such as a solvent in the adhesive coating composition is removed and the solid remains, so the thermal fusion layer has the same components and component ratio as the solid in the adhesive coating composition. The description on the component of the thermal fusion layer overlaps with the description on the adhesive coating composition, so no repeated description will be provided.

The electrical steel sheet product according to an exemplary embodiment of the present invention includes: a plurality of electrical steel sheets; and an adhesive layer provided between the plurality of electrical steel sheets. FIG. 1 shows a schematic view of an electrical steel sheet product according to an exemplary embodiment of the present invention. As shown in FIG. 1, a plurality of electrical steel sheets are stacked.

Figure 2:
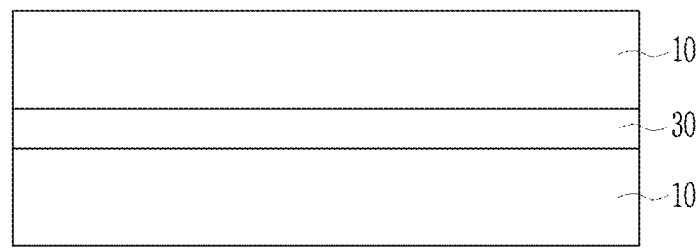
FIG. 2 shows a schematic diagram on a cross-section of an electrical steel sheet product according to an exemplary embodiment of the present invention.

FIG. 2 shows a schematic diagram of a cross-section of an electrical steel sheet product according to an exemplary embodiment of the present invention. As shown in FIG. 2, the electrical steel sheet product 100 according to an exemplary embodiment of the present invention includes: a plurality of electrical steel sheets 10; and an adhesive layer 30 provided between the plurality of electrical steel sheets.

The electrical steel sheet product according to an exemplary embodiment of the present invention may be a product generated by performing a thermal fusion to different electrical steel sheets by forming an adhesive layer by using the above-noted adhesive coating composition without using an existing method such as welding, clamping, or interlocking.

In this instance, according to the characteristic of the above-described adhesive coating composition, the electrical steel sheet product has the characteristic that a surface characteristic and an attaching characteristic are not deteriorated even though it is a product that has excellent high temperature adherence and high temperature oil resistance after thermal fusion, and particularly that is manufactured through stress relief annealing.

Respective components will now be described in detail.

The electrical steel sheet 10 may be a general non-oriented or oriented electrical steel sheet 10 without limits. In an exemplary embodiment of the present invention, it is a major configuration to manufacture an electrical steel sheet product 100 by forming an adhesive layer 30 between a plurality of electrical steel sheets 10, so no detailed description on the electrical steel 10 will be provided.

The adhesive layer 30 is formed between a plurality of electrical steel sheets 10, and adherence is strong such that a plurality of electrical steel sheets 10 may be attached without using the existing coupling method such as welding, clamping, or interlocking.

The adhesive layer 30 may be formed by coating the above-noted adhesive coating composition on the surface and hardening the same to form an adhesive coating layer, stacking the same, and performing thermal fusion to the same to form a thermal fusion layer, and performing stress relief annealing. When a plurality of electrical steel sheets 10 on which the adhesive coating layer is formed are stacked and thermally fused, a resin component of the adhesive coating layer is thermally fused, thereby forming a thermal fusion layer. When an electrical steel sheet laminate on which the thermal fusion layer undergoes the stress relief annealing again, an organic component such as the resin from among the adhesive coating composition component is mostly decomposed into $CO_2$ or CO, and part thereof remains. The $CO_2$ or CO produced by a decomposition is not completely gasified, and it is recombined in a carbide form in the adhesive layer 30. Further, O derived from the organic/inorganic composite resin and the composite metal phosphate is produced in an oxide form and then grows.

N derived from the stress relief annealing atmosphere and the air is produced in a nitride form and then grows. A carbide, an oxide, and a nitride produced and grown in this way acquire adherence in the adhesive layer 30.

In an exemplary embodiment of the present invention, the adhesive layer 30 may include 50 to 90 wt % of the inorganic material. Adherence of the adhesive layer 30 is formed by an inorganic material network formation and growth. When there is a very large amount of the inorganic material, adherence may be deteriorated at the time of thermal fusion. When there is a very small amount of the inorganic material, adherence may be deteriorated after stress relief annealing. In further detail, the adhesive layer 30 may include 60 to 75 wt % of the inorganic material.

In an exemplary embodiment of the present invention, the adhesive layer 30 includes 10 to 30 wt % of P, 10 to 30 wt % of at least one metal selected from among Si, Ti, Zr, Al, Co, Ca, Zn, and Mg, 1 to 10 wt % of N, 1 to 10 wt % of C, and O as a balance.

The phosphorous (P) is derived from a composite metal phosphate and a phosphoric acid in the adhesive coating composition. Adherence may be maintained when an appropriate content of P is included.

Si, Ti, Al, Zr, Zn, and Mg may be derived from $SiO_2$, $Al_2O_3$, $TiO_2$, MgO, ZnO, or $ZrO_2$ that are inorganic nanoparticles substituted to the resin.

At least one metal selected from among Al, Co, Ca, Zn, and Mg may be derived from the composite metal phosphate in the adhesive coating composition. When an appropriate content of the above-noted metal is included, adherence may be maintained. When a plurality of types of the above-described metals are included, the content of the multiple types of the metals are included in the above-noted range.

C, O, and N cohere with the above-described P and at least one metal selected from among Al, Co, Ca, Zn, and Mg to produce and grow a carbide, an oxide, or a nitride, and thereby acquire adherence in the adhesive layer 30. Adherence may be acquired when C, O, and N are included in the above-noted ranges. C may be derived from a resin component, and O and N may be derived from the air.

In an exemplary embodiment of the present invention, the adhesive layer may include at least one of Cu, Cr, Fe, B, Si, Na, and K at 1 to 20 wt %. These elements are derived from an additive in the adhesive coating composition, and they cohere with C, O, and N to produce and grow the carbide, oxide, or nitride and thereby acquire adherence in the adhesive layer 30.

In an exemplary embodiment of the present invention, the carbide may be $CaC_2$, $Na_2C_2$, $H_2C_2$, $Al_4C_3$, $Mg_2C_3$, SiC, $B_4C$, CO, and $CO_2$, the oxide may be $Na_2O$, $K_2O$, CaO, MgO, $Al_2O_3$, $Fe_2O_3$, CoO, MgO, $Na_2O$, CaO, FeO, $Al_2O_3$, $K_2O$, and $SiO_2$, and the nitride may be $K_3N$, $Mg_3N_2$, $Ca_3N_2$, $Fe_2N$, $Zn_3N_2$, $(CN)_2$, $S_4N_4$, and SiN.

Regarding a cross-sectional area of the adhesive layer 30, an area fraction of the adhesive layer 30 having formed an aggregated body with a particle diameter that is equal to or greater than 30 nm when the inorganic components of the adhesive layer 30 are aggregated with each other may be equal to or less than 0.1. The area fraction signifies the area of the aggregated body when the entire area is set to be 1.

By the water-soluble resin component in the above-noted adhesive coating composition, the composite metal phosphate and the inorganic component in the additive are uniformly dispersed, and the inorganic component is not aggregated when stress relief annealing is performed. The inorganic component is not aggregated but is uniformly dispersed, thereby further acquiring adherence in the adhesive layer 30. In an exemplary embodiment of the present invention, the aggregated body signifies a matter that is generated when the above-noted P, Si, Al, Co, Ca, Zn, and Mg have reacted with C, O, and N and have aggregated to each other.

The adhesive layer 30 may have the fraction of the area occupied by a pore, that is equal to or less than 0.5, with respect to a cross-sectional area of the adhesive layer 30. As the area occupied by the pore is small, when stress relief annealing is performed, CO and $CO_2$ produced by thermally decomposing the water-soluble organic component are not completely gasified, but are produced in a carbide or oxide form. In further detail, the fraction of the area occupied by the pore may be equal to or less than 0.1. In further detail, the fraction of the area occupied by the pore may be equal to or less than 0.01.

A thickness of the adhesive layer 30 may be 0.5 to 25 μm. When the range is satisfied, the adhesive layer 30 may have excellent surface characteristics (e.g., insulation, corrosion resistance, and close contacting property).

Hardness of the adhesive layer 30 may be equal to or greater than 5 with reference to Rockwell hardness. When the hardness is very much low, a sticky drawback and a workability drawback may be generated to the surface.

Figure 3:
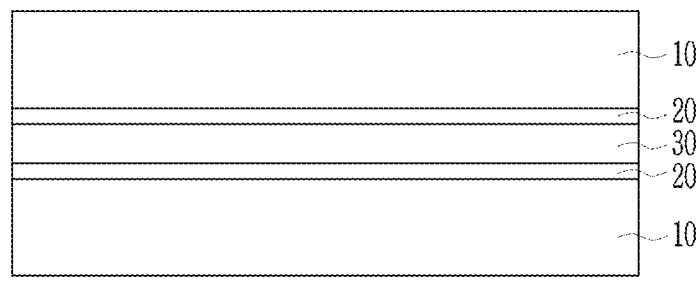
FIG. 3 shows a schematic diagram on a cross-section of an electrical steel sheet product according to another exemplary embodiment of the present invention.

FIG. 3 shows a schematic diagram of a cross-section of an electrical steel sheet product according to another exemplary embodiment of the present invention. As shown in FIG. 3, the electrical steel sheet product 100 according to an exemplary embodiment of the present invention includes: a plurality of electrical steel sheets 10; an adhesive layer 30 provided between a plurality of electrical steel sheets; and an oxidation layer 20 provided between the electrical steel sheets 10 and the adhesive layer 30.

The oxidation layer 20 produces a dense passivation layer by a high temperature reaction on the inorganic and metal component provided on the fusion layer and the oxide provided on a base layer in the stress relief annealing process. As the oxidation layer 20 is formed, production of an oxide in the electrical steel 10 may be suppressed, and magnetism of the electrical steel sheet product 100 may be further improved.

The oxidation layer may include 10 to 30 wt % of P, 10 to 30 weight of at least one type of metal selected from among Si, Ti, Zr, Al, Co, Ca, Zn, and Mg, and O as a balance. P is derived from the composite metal phosphate in the adhesive coating composition like the adhesive layer 30. The at least one type of metal selected from among Si, Ti, Zr, Al, Co, Ca, Zn, and Mg is derived from the inorganic nanoparticles that are substituted for a water-soluble resin in the adhesive coating composition and the composite metal phosphate. The oxidation layer 20 is different from the adhesive layer 30 in that the same hardly includes N and C. In addition, the oxidation layer 20 may further include Fe and Si diffused from the electrical steel sheet 10 in the stress relief annealing process.

A thickness of the oxidation layer 20 may be 10 to 500 nm. When the oxidation layer 20 is very thin, an oxide may be produced in the electrical steel sheet 10, which may apply a bad influence to magnetism. When the oxidation layer 20 is very thick, the close contacting property between the oxidation layer and the resin layer is not good, so bonding strength may be deteriorated.

The oxidation layer 20 has greater hardness than the adhesive layer 30. In detail, the hardness of the oxidation layer 20 may be equal to or greater than 20 with reference to the Rockwell hardness.

As described above, as the oxidation layer 20 is formed, production of the oxide in the electrical steel sheet 10 is suppressed. In detail, the area fraction of the oxide produced within 10 μm in an inner direction of the electrical steel sheet 10 from an interface of the oxidation layer 20 and the electrical steel sheet 10 may be equal to or less than 0.05. Further, when an oxide is produced, its particle diameter is much small, thereby minimizing an influence applied to the magnetism. In detail, the average particle diameter of the oxide produced within 10 μm in an inner direction of the electrical steel sheet 10 from an interface of the oxidation layer 20 and the electrical steel sheet 10 may be 0.01 to 5 μm.

A method for manufacturing an electrical steel sheet product according to an exemplary embodiment of the present invention includes: a step for preparing for an adhesive coating composition; a step for coating the adhesive coating composition on a surface of an electrical steel sheet, and hardening the same to form an adhesive coating layer; a step for stacking a plurality of electrical steel sheets on which the adhesive coating layer is formed, and performing thermal fusion to form a thermal fusion layer; and a step for performing stress relief annealing to the thermally fused electrical steel sheet laminate to form an adhesive layer.

The respective steps will now be described in detail.

First, an adhesive coating composition is prepared. The adhesive coating composition has already been described, so no repeated description will be provided.

Next, the adhesive coating composition is coated on a surface of an electrical steel sheet, and the same is hardened to form an adhesive coating layer. This step may be performed at a temperature range of 200 to 600° C. so as to harden the adhesive coating composition.

A plurality of electrical steel sheets on which an adhesive coating layer is formed are stacked, and the same are thermally fused to form a thermal fusion layer. Through the thermal fusion step, the resin components in the adhesive coating layer are thermally fused, and a thermal fusion layer is formed.

The thermal fusion step may perform thermal fusion at the temperature of 150 to 300° C., a pressure of 0.5 to 5.0 MPa, and a pressurizing condition of 0.1 to 120 minutes. The conditions may be respectively independently satisfied, and two or more conditions may be simultaneously satisfied. Dense thermal fusion may be performed between the electrical steel sheets without gaps or pores by adjusting the temperature, pressure, and time conditions in the thermal fusion step as described above.

The thermal fusion step includes a temperature raising step and a fusion step, and a temperature raising speed in the temperature raising step may be 10° C./min to 1000° C./min.

A shrinkage rate of the thermal fusion layer may be equal to or less than 0.1%. In this instance, the shrinkage rate is calculated as ([a thickness of the adhesive coating layer before the step for forming a thermal fusion layer]-[a thickness of the thermal fusion layer after the step for forming a thermal fusion layer])/[a thickness of the adhesive coating layer before the step for forming a thermal fusion layer]. The meaning that the shrinkage rate of the thermal fusion layer is small represents a meaning that dense thermal fusion is performed in the thermal fusion layer without pores or gaps, and after this, and it means that gas (CO or $CO_2$) produced by decomposing a water-soluble resin component in the stress relief annealing process is not discharged outside of the adhesive layer, but is formed to be a carbide and an oxide. Therefore, as the shrinkage rate decreases, adherence of the adhesive layer is improved.

Next, an adhesive layer is formed by performing stress relief annealing to the thermally fused electrical steel sheet laminate. The stress relief annealing may be performed for 30 to 180 minutes at the temperature of 500 to 900° C.

The step for forming an adhesive layer may be performed in the modified gas or nitrogen ($N_2$) gas atmosphere. In detail, the modified gas signifies a gas including 10 to 30 vol % of liquefied natural gas (LNG) and 70 to 90 vol % of air. The nitrogen gas atmosphere signifies the atmosphere including nitrogen. In detail, it signifies a gas including 100 vol % of nitrogen or a gas including nitrogen at equal to or greater than 90 and less than 100 vol % and hydrogen by greater than 0 and equal to or less than 10 vol %.

The step for forming an adhesive layer may further include producing an oxidation layer between the adhesive layer and the electrical steel sheet. The adhesive layer and the oxidation layer have been described, so no repeated descriptions thereof will be provided.

When manufactured by the method for manufacturing an electrical steel sheet product according to an exemplary embodiment of the present invention, the magnetism (in detail, iron loss and magnetic flux density) of the electrical steel sheet may be improved after stress relief annealing, and high temperature adherence and high temperature oil resistance by the adhesive coating layer are excellent, and particularly, a surface characteristic and an attaching characteristic may not be deteriorated after stress relief annealing.

A preferable example of the present invention, a comparative example in contrast to the same, and an estimation example thereof will now be described. However, the example described below is one desirable exemplary embodiment of the present invention, and the present invention is not limited thereto.

Experimental Example 1

An attaching and coating composition is expressed in the following Table 1 and Table 2, where the content of the nanoparticles substituted for the water-soluble resin is fixed to be 10 wt % compared to 100 wt % of the solid of the water-soluble resin, and the particle size is 5 nm to 50 nm depending on the substituted nanoparticle type.

An electrical steel sheet (50×50 mm, 0.35 mmt) is prepared as an empty specimen. The adhesive coating solution configured with the components shown in following Table 1 and Table 2 is coated on an upper portion and a lower portion of the prepared empty specimen with a constant thickness (about 5.0 μm) by using a bar coater and a roll coater, the same is hardened for twenty seconds at 400° C., and then slowly cooled in the air to form an adhesive coating layer.

The electrical steel sheets on which the adhesive coating layer is coated are stacked to be 20 mm high, and they are pressurized with a force of 500 Kgf to perform thermal fusion to the same for sixty minutes at 220° C. Stress relief annealing is performed to the electrical steel sheet acquired in the fusion condition at 780° C., which is a stress relief annealing condition, and in an atmosphere of 100 vol % of nitrogen. Adherence of the electrical steel sheet thermally fused for respective conditions and adherence on the respective electrical steel sheets having undergone stress relief annealing by a shearing surface tension method are measured and are expressed in Table 3.

Detailed estimation conditions thereof are as follows.

Solution Stability:

The respective adhesive coating compositions are strongly agitated for thirty minutes by an agitator, and then maintained for thirty minutes without agitation. Next, it is determined whether there is a precipitate or gel phenomenon in the composition.

Surface Characteristic:

Insulation, corrosion resistance, and close contacting property for the coating layer before thermal fusion, formed by respective adhesive coating compositions, are synthetically observed and estimated, and when the insulation, corrosion resistance, and close contacting property are good, it is expressed as excellent, when two of the items are good, it is expressed as good, when one of the items is good, it is expressed as normal, and when all of them are deteriorated, it is expressed as deteriorated.

Adherence:

Adherence before/after stress relief annealing are measured by using a device for measuring a tensile force of stacked samples while pulling at a constant speed after fixing to an upper/lower jig with a constant force. In this instance, the measured value is a measured point where an interface with minimum adherence is missed from among interfaces of the stacked samples.

The adherence before/after stress relief annealing is estimated based on different references. When the measured adherence before stress relief annealing after a thermal fusion is equal to or greater than 1.0 MPa, it is expressed as excellent, when the same is equal to or greater than 0.5 MPa, it is expressed as good, when the same is equal to or greater than 0.2 MPa, it is expressed as normal, and when the same is equal to or less than 0.1 MPa, it is expressed as deteriorated. In another way, when the measured adherence after stress relief annealing is finished is equal to or greater than 0.5 MPa, it is expressed as excellent, when the same is equal to or greater than 0.2 MPa, it is expressed as good, when the same is equal to or greater than 0.1 MPa, it is expressed as normal, and when the same is equal to or less than 0.05 MPa, it is expressed as deteriorated.

TABLE 1

| | Adhesive coating composition | | | | | |
|---|---|---|---|---|---|---|
| | Resin | | | Organic/inorganic composite | | |
| | Type | Aromatic hydrocarbon exists/or not | wt % | Inorganic particle type | Substituted amount (%) | wt % |
| Example 1 | Epoxy | ○ | 35 | $SiO_2$ | 30 | 25 |
| Example 2 | Phenol | ○ | 35 | ZnO | 10 | 35 |
| Example 3 | Vinyl | ○ | 35 | $TiO_2$ | 20 | 20 |
| Example 4 | Epoxy/siloxane = 1/1 | ○ | 35 | $SiO_2$ | 25 | 25 |
| Example 5 | Styrene/vinyl = 1/1 | ○ | 35 | $TiO_2$ | 15 | 15 |
| Example 6 | Ethylene/urethane = 1/1 | ○ | 35 | $Al_2O_3$ | 20 | 20 |
| Example 7 | Epoxy/acryl = 1/1 | ○ | 35 | $SiO_2$ | 15 | 15 |
| Example 8 | Urethane/vinyl = 1/1 | ○ | 40 | $Al_2O_3/TiO_2$ | 15 | 15 |
| Example 9 | Styrene/vinyl/ethylene = 1/1/1 | ○ | 30 | $Al_2O_3/TiO_2$ | 30 | 30 |
| Example 10 | Urethane/epoxy/acryl = 1/1/1 | ○ | 35 | $SiO_2/Al_2O_3$ | 20 | 15 |
| Comparative Example 1 | Acryl | X | 50 | — | — | — |
| Comparative Example 2 | Styrene | X | 40 | — | — | — |
| Comparative Example 3 | Ethylene | X | 40 | $Al_2O_3$ | 20 | 25 |
| Comparative Example 4 | Acryl | X | 50 | — | — | — |
| Comparative Example 5 | Urethane | ○ | 40 | $Al_2O_3$ | 30 | 30 |
| Comparative Example 6 | Ethylene | X | 40 | $Al_2O_3$ | 20 | 20 |
| Comparative Example 7 | Siloxane | ○ | 35 | $SiO_2$ | 20 | 20 |
| Comparative Example 8 | Siloxane/acryl = 1/1 | ○ | 40 | $SiO_2$ | 30 | 30 |
| Comparative Example 9 | Phenol/styrene = 1/1 | ○ | 40 | ZnO | 20 | 20 |
| Comparative Example 10 | Epoxy | ○ | 35 | $SiO_2$ | 30 | 35 |
| Comparative Example 11 | Styrene | X | 50 | — | — | — |
| Comparative Example 12 | Urethane | ○ | 40 | $Al_2O_3$ | 30 | 30 |
| Comparative Example 13 | Acryl/phenol = 1/1 | ○ | 45 | ZnO | 15 | 5 |
| Comparative Example 14 | Vinyl/ethylene = 1/1 | ○ | 35 | $TiO_2/Al_2O_3$ | 20 | 20 |
| Comparative Example 15 | Epoxy/siloxane/acryl = 1/1/1 | ○ | 35 | $SiO_2$ | 25 | 20 |

TABLE 2

| | Adhesive coating composition | | | | |
|---|---|---|---|---|---|
| | Composite metal phosphate | | Phosphoric acid | Cohesion reinforcing agent | |
| | Type | wt % | (wt %) | Type (weight ratio) | wt % |
| Example 1 | MAP/MCoP = 1/1 | 15 | 15 | 3-glycidoxy propyltrimethoxysilane | 10 |
| Example 2 | MCP/MMP = 1/1 | 10 | 10 | MgO/Ca (OH)$_2$ = 1/1 | 10 |
| Example 3 | MCoP/MCP = 1/1 | 20 | 15 | KOH | 10 |
| Example 4 | MAP | 15 | 20 | Carbon black/Mg(OH)$_2$ = 1/1 | 5 |
| Example 5 | MZP | 15 | 25 | Al$_2$O$_3$ | 10 |
| Example 6 | MZP | 20 | 20 | Al(OH)$_2$ | 5 |
| Example 7 | MAP | 20 | 20 | 3-glycidoxy propyltrimethoxysilane | 10 |
| Example 8 | MAP/MCoP/MZP = 1/1/1 | 25 | 10 | Fe$_2$O$_3$/Al(OH)$_2$/H$_3$PO$_4$ = 1/1/1 | 10 |
| Example 9 | MAP/MCoP = 1/1 | 20 | 10 | Carbon black/CaO/NaOH = 1/1/1 | 10 |
| Example 10 | MAP/MCoP = 1/1 | 20 | 25 | Phthalocyanine Blue/Al(OH)$_2$ = 1/1 | 5 |
| Comparative Example 1 | MAP/MZP = 1/1 | 20 | 20 | Phthalocyanine Green/CNT = 1/1 | 10 |
| Comparative Example 2 | MCoP/MCP = 1/1 | 25 | 25 | Fe$_2$O$_3$ | 10 |
| Comparative Example 3 | MCoP/MCP = 1/1 | 15 | 20 | — | — |
| Comparative Example 4 | MAP/MCoP = 1/1 | 50 | — | — | — |
| Comparative Example 5 | MZP | 20 | — | Al(OH)$_2$ | 10 |
| Comparative Example 6 | MCoP/MCP = 1/1 | 40 | — | — | — |
| Comparative Example 7 | — | 35 | — | CNT | 10 |
| Comparative Example 8 | MAP/MCoP = 1/1/1 | 20 | 10 | — | — |
| Comparative Example 9 | MAP | 15 | 25 | — | — |
| Comparative Example 10 | MAP | 15 | 15 | — | — |
| Comparative Example 11 | MAP/MCP = 1/1 | 40 | 10 | — | — |
| Comparative Example 12 | — | — | 20 | Al(OH)$_2$ | 10 |
| Comparative Example 13 | — | — | 40 | Phthalocyanine blue | 10 |
| Comparative Example 14 | — | — | 40 | Fe$_2$O$_3$ | 5 |
| Comparative Example 15 | — | — | 40 | Mg(OH)$_2$/H$_3$BO$_3$ = 1/1 | 5 |

MAP = Al(H$_3$PO$_4$)$_2$,
MCoP = (Co(H$_3$PO$_4$)$_2$,
MCP = Ca(H$_3$PO$_4$)$_2$,
MZP = Zn(H$_3$PO$_4$)$_2$,
MMP = Mg(H$_3$PO$_4$)$_2$

TABLE 3

| | Surface characteristic | Adherence | |
|---|---|---|---|
| | | Thermal fusion | After SRA |
| Example 1 | ◎ | ◎ | ○ |
| Example 2 | ○ | ○ | ○ |
| Example 3 | ○ | ○ | ○ |
| Example 4 | ○ | ◎ | ◎ |
| Example 5 | ○ | ◎ | ○ |
| Example 6 | Δ | ◎ | ○ |
| Example 7 | ◎ | ◎ | ◎ |
| Example 8 | ○ | ◎ | ○ |
| Example 9 | ○ | ◎ | ○ |
| Example 10 | ◎ | ◎ | ○ |

TABLE 3-continued

| | Adherence | | |
|---|---|---|---|
| | Surface characteristic | Thermal fusion | After SRA |
| Comparative Example 1 | r | ○ | x |
| Comparative Example 2 | ⊚ | ○ | x |
| Comparative Example 3 | ⊚ | ○ | x |
| Comparative Example 4 | ⊚ | ○ | x |
| Comparative Example 5 | ○ | ○ | x |
| Comparative Example 6 | ⊚ | ○ | x |
| Comparative Example 7 | ⊚ | Δ | x |
| Comparative Example 8 | ○ | ○ | Δ |
| Comparative Example 9 | Δ | ○ | Δ |
| Comparative Example 10 | ⊚ | ○ | Δ |
| Comparative Example 11 | ⊚ | Δ | Δ |
| Comparative Example 12 | ⊚ | ○ | Δ |
| Comparative Example 13 | Δ | ○ | Δ |
| Comparative Example 14 | ⊚ | ○ | Δ |
| Comparative Example 15 | Δ | Δ | Δ |

[Physical property determination/Excellent: ⊚, Good: ○, Normal: r, Deteriorated: x]

As can be known from Table 1 to Table 3, Example 1 to Example 10 satisfying configurational components and component ratios of the present invention may have the surface characteristic, the adherence of the thermal fusion layer before stress relief annealing, and the adherence of the adhesive layer after stress relief annealing that are good.

The solution stability of the adhesive coating composition configured with an organic/inorganic composite, a metal phosphate, and an additive shows a somewhat deteriorated trend when CNT or carbon black (Examples 8 and 9) are added, and another additive excluding the CNT and the carbon black generally has good solution stability with the water-soluble resin and the metal phosphate.

The thermal fusion is performed under the same conditions including the temperature of 220° C., the pressurization of 500 Kgf, and the pressurizing time of sixty minutes, and the adherence is then estimated. In general, as an injected content of the metal phosphate and the additive increases, adherence after a thermal fusion is slightly deteriorated.

The adherence is estimated after stress relief annealing is performed to the thermally fused electrical steel sheet at the stress relief annealing temperature of 780° C., for the stress relief annealing time of 120 minutes, and in the atmosphere of $N_2$ at 100 vol %. The adherence after stress relief annealing has a trend of being relatively deteriorated, compared to the adherence before stress relief annealing. This is analyzed as being because the water-soluble resin is decomposed in the high-temperature stress relief annealing process, a pore exists between single sheets, and the adherence is relatively reduced. However, a gap between the single sheets is very densely attached by thermal fusion before the stress relief annealing process to prevent the atmosphere (nitrogen, oxygen, or carbon monoxide) from permeating, and minimize the loss of the decomposed resin, thereby maintaining the adherence between the single-piece electrical steel sheet bonding layer. Further, in the high temperature atmosphere, the water-soluble resin is decomposed, an oxidation layer is formed between the interface of the electrical steel sheet and the attachable coating, and the oxide grows in the stress relief annealing process, so the adherence between the single-piece electrical steel sheets is improved after stress relief annealing.

On the contrary, in Comparative Example 1 to Comparative Example 3 in which a resin without an aromatic hydrocarbon is applied, the surface characteristic and the adherence of the thermal fusion layer before stress relief annealing may be acquired, and the adherence of the adhesive layer after stress relief annealing (SRA) is deteriorated.

Further, in Comparative Example 4 to Comparative Example 7 in which not the phosphoric acid but the composite metal phosphate is used, the adherence of the adhesive layer after stress relief annealing (SRA) is deteriorated.

Further, in Comparative Example 8 to Comparative Example 11 in which a cohesion reinforcing agent is not used, the adherence of the adhesive layer after stress relief annealing (SRA) is deteriorated.

Further, in Comparative Example 12 to Comparative Example 15 in which a composition configured with the phosphoric acid except for the composite metal phosphate is used, the adherence of the adhesive layer after stress relief annealing (SRA) is deteriorated.

Experimental Example 2

It is performed in a like manner of Experimental Example 1, but components of the adhesive coating solution and the stress relief annealing condition are modified as expressed in the following Table 4.

TABLE 4

| | | SRA condition | | |
|---|---|---|---|---|
| Category | Adhesive coating solution component | Temperature (° C.) | Time (hour) | Atmosphere |
| Example 7 | Example 7 | 780 | 2 | $N_2$ 100% |
| Example 8 | Example 8 | | | |
| Example 11 | Example 7 | 780 | 2 | Modified gas |
| Example 12 | Example 8 | | | |

Figure 4:
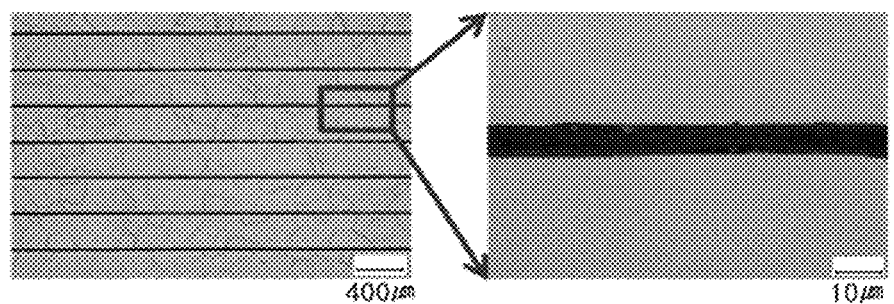
FIG. 4 shows a photograph of a cross-section of an electrical steel sheet product taken by a scanning electron microscope (SEM) after thermal fusion in Example 7.
Figure 5:
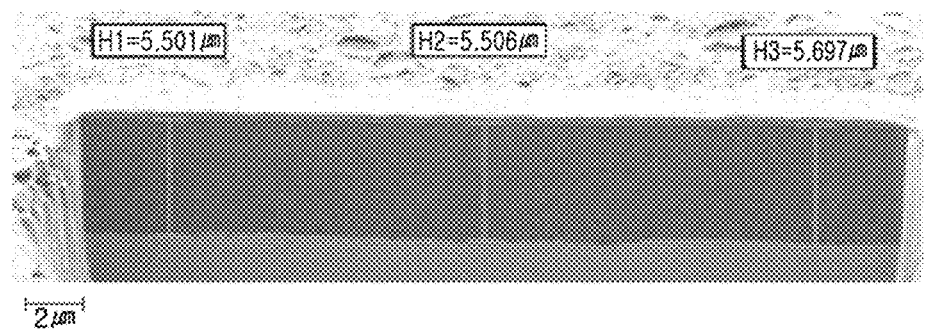
FIG. 5 shows a photograph of a cross-section of an electrical steel sheet product taken by a scanning electron microscope (SEM) and a thickness measured result after thermal fusion in Example 7.

FIG. 4 shows a photograph of a cross-section of an electrical steel sheet product taken by a scanning electron microscope (SEM) after a thermal fusion process is finished (before an SRA process) in Example 7.

Referring to FIG. 4, in Example 7, a cross-section of a product having undergone a thermal fusion process is observed to be fused in the thermal fusion layer without an empty space. It is determined that the thermal fusion layer has a thickness of 5.5 to 5.6 μm.

Figure 6:
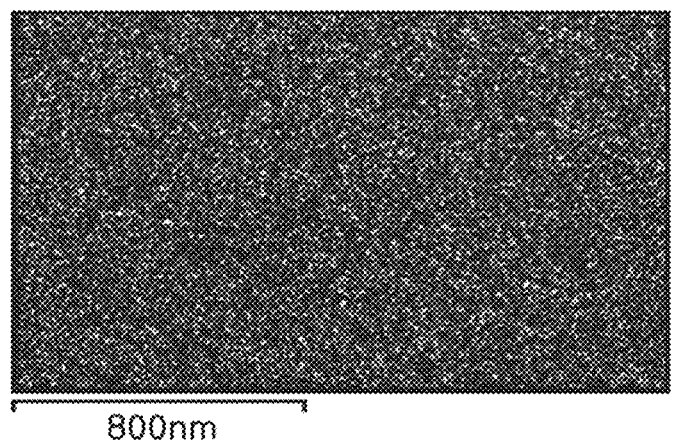
FIG. 6 shows an analysis result of an element of Si on a thermal fusion layer after thermal fusion in Example 7.
Figure 7:
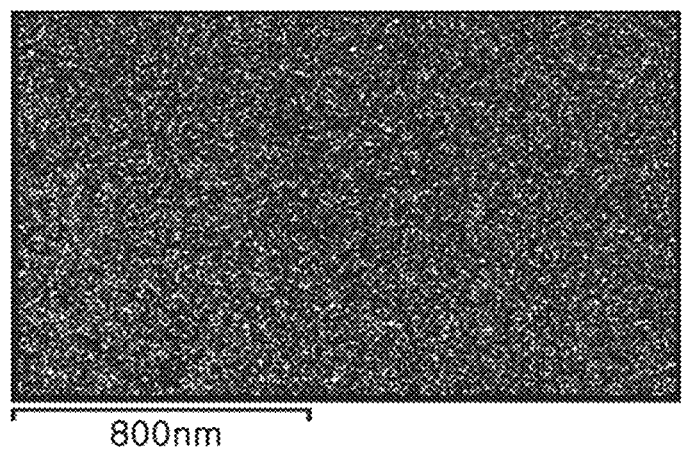
FIG. 7 shows an analysis result of an element of P on a thermal fusion layer after thermal fusion in Example 7.

FIG. 6 and FIG. 7 respectively show analysis results of elements of Si and P of the thermal fusion layer. As shown in FIG. 6 and FIG. 7, it is determined that the elements of Si and P are uniformly dispersed in the thermal fusion layer.

Figure 8:
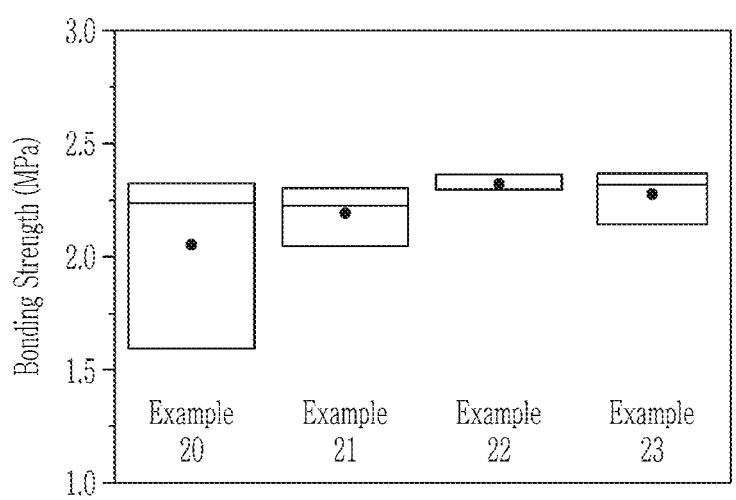
FIG. 8 shows an adherence measured result of a thermal fusion layer after thermal fusion in Examples 7, 8, 11, and 12.

FIG. 8 shows an adherence measured result of a thermal fusion layer after thermal fusion in Examples 7, 8, 11, and 12. It is determined that all of them have good adherence of 2.0-2.5 MPa after thermal fusion.

Figure 9:
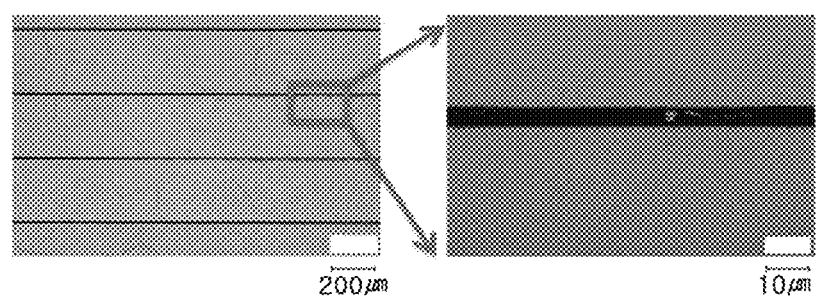
FIG. 9 shows a photograph of a cross-section of an electrical steel sheet product taken by a scanning electron microscope (SEM) after stress relief annealing in Example 7.
Figure 10:
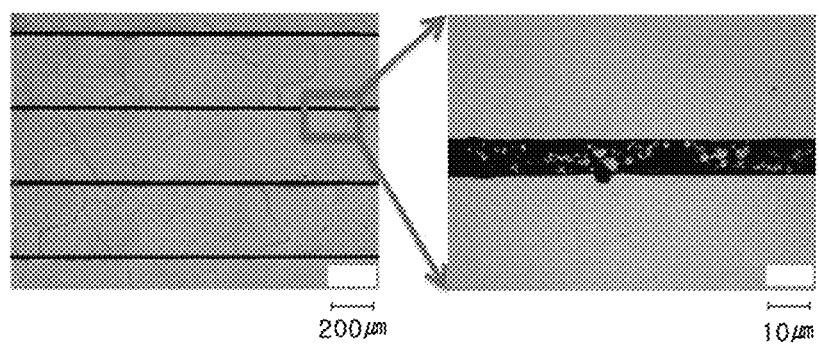
FIG. 10 shows a photograph of a cross-section of an electrical steel sheet product taken by a scanning electron microscope (SEM) after stress relief annealing in Example 11.

FIG. 9 and FIG. 10 show photographs of a cross-section of an electrical steel sheet product taken by a scanning electron microscope (SEM) after stress relief annealing in Examples 7 and 11. When stress relief annealing is performed in the nitrogen atmosphere, it is determined that a lesser amount of pores are formed and a dense adhesive layer is formed compared to performance of stress relief annealing in the modified gas atmosphere.

Figure 11:
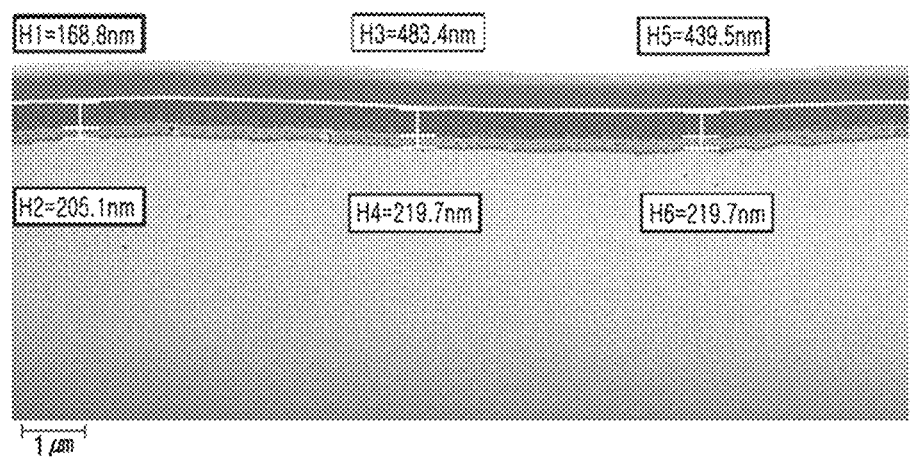
FIG. 11 shows a photograph of a cross-section of an electrical steel sheet product taken by a scanning electron microscope (SEM) and a thickness measured result after stress relief annealing in Example 7.
Figure 12:
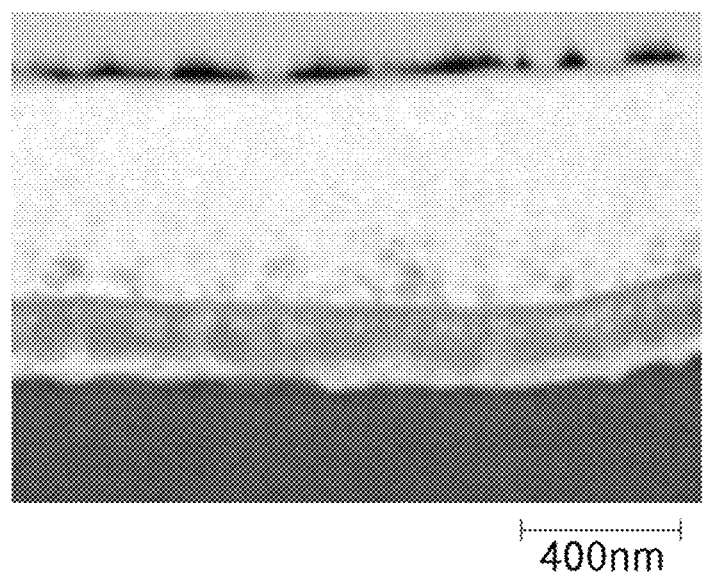
FIG. 12 to FIG. 17 show results of an electron probe microanalysis (EPMA) on a cross-section of an electrical steel sheet product after stress relief annealing in Example 7.
Figure 13:
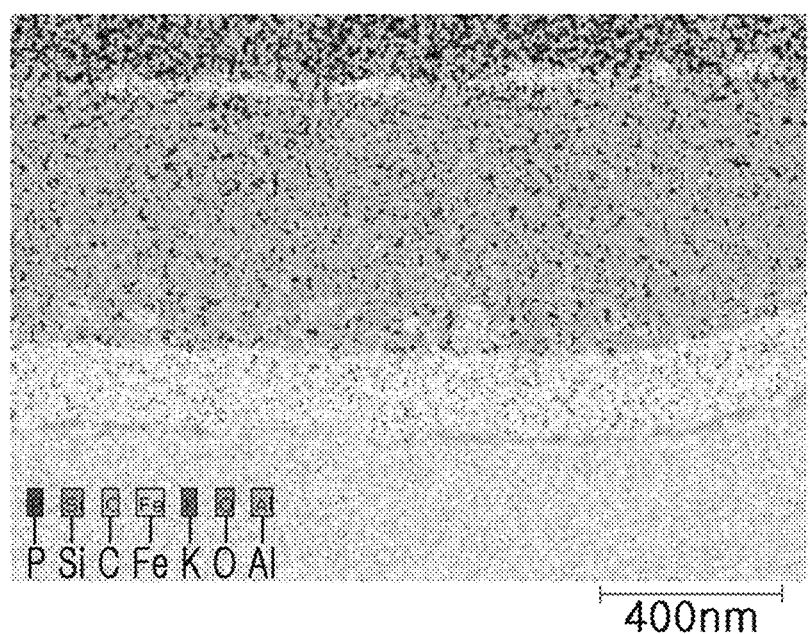
Figure 14:
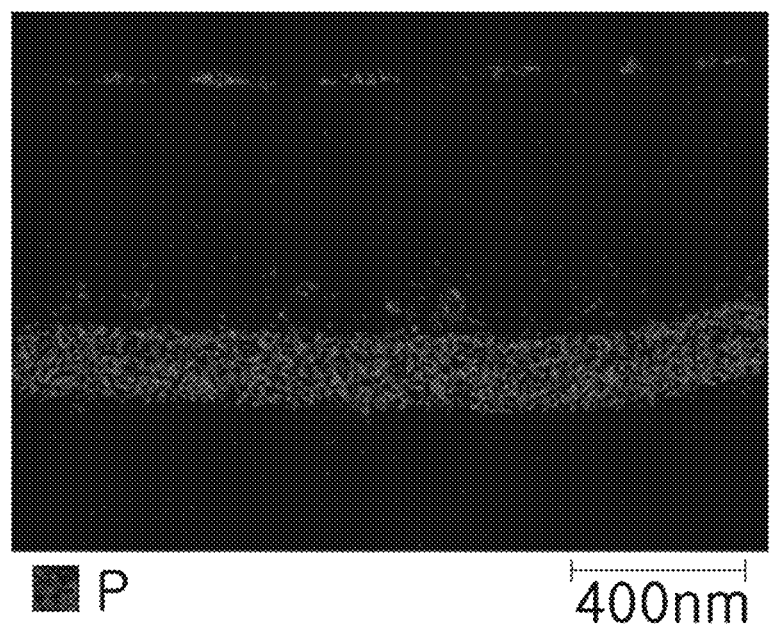
Figure 15:
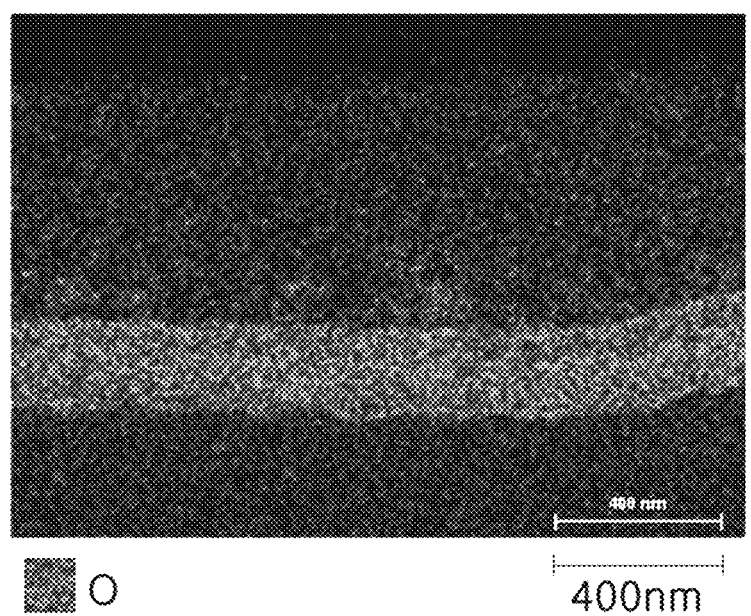
Figure 16:
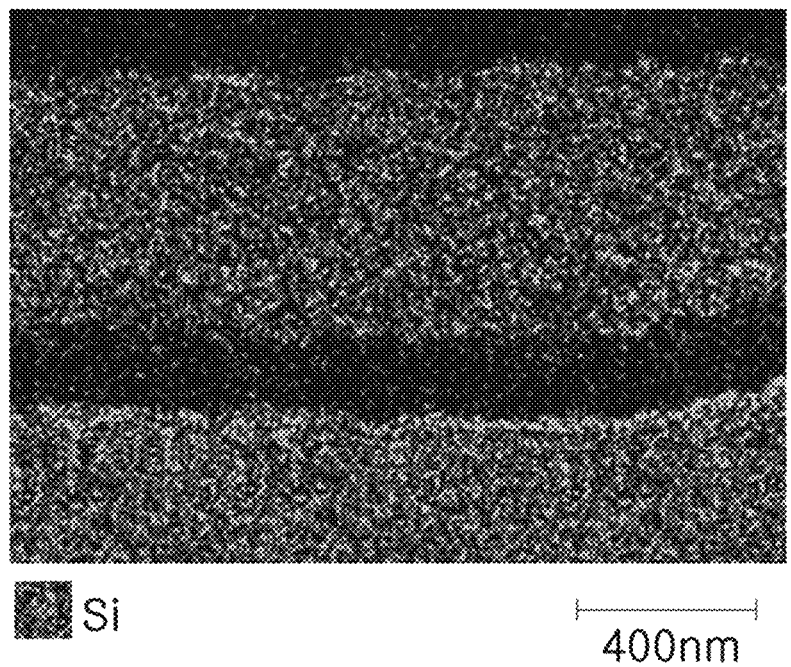
Figure 17:
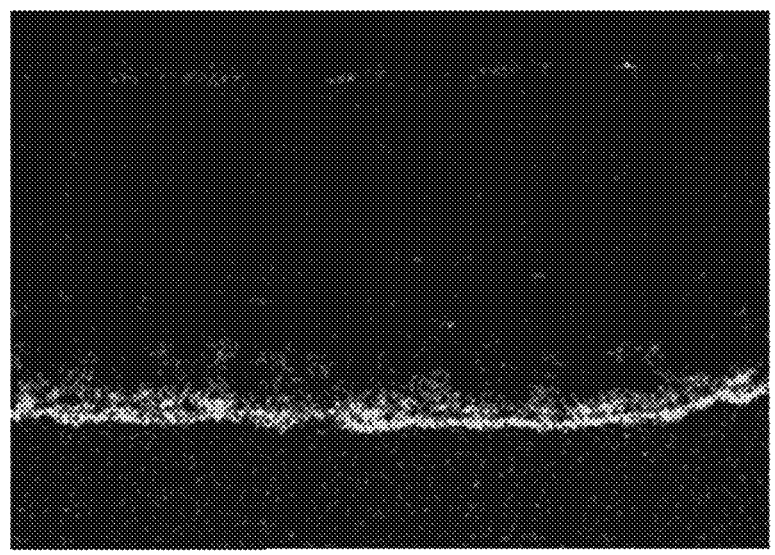
Figure 18:
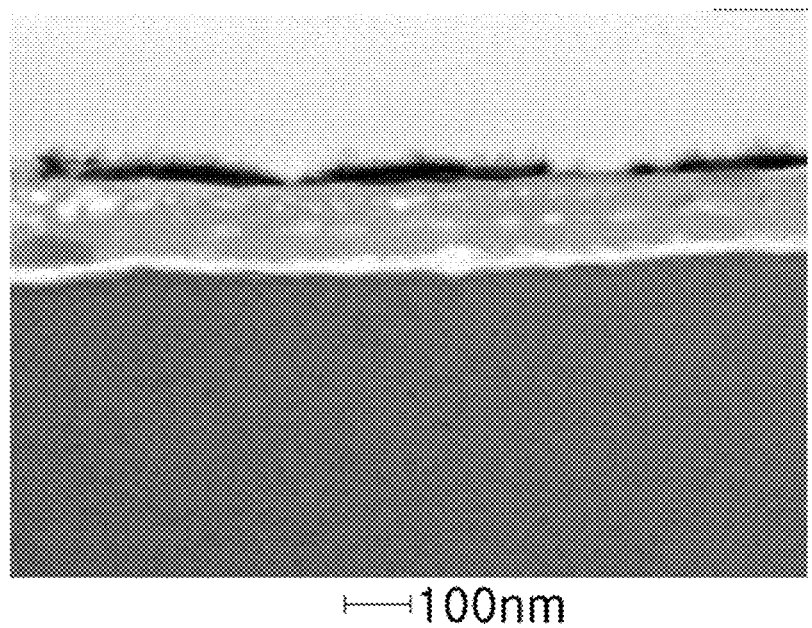
FIG. 18 to FIG. 23 show results of an electron probe microanalysis (EPMA) on a cross-section of an electrical steel sheet product after stress relief annealing in Example 11.
Figure 19:
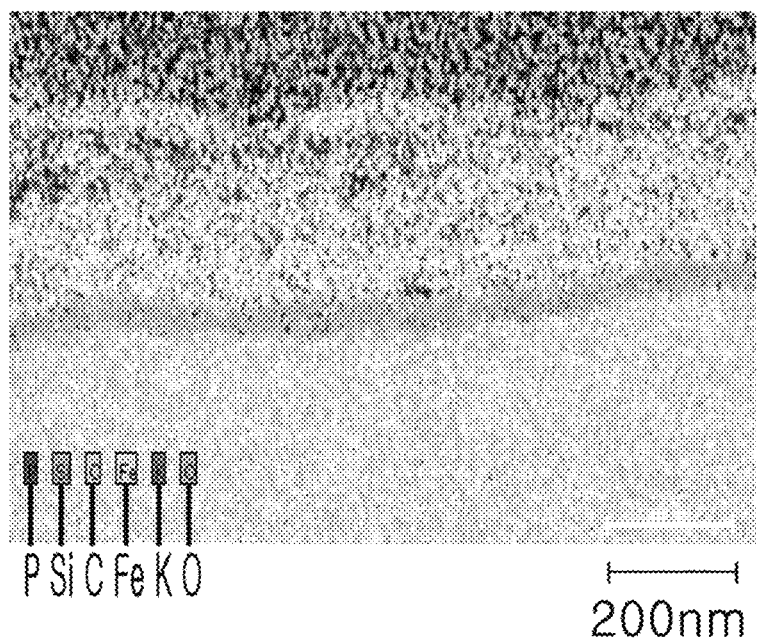
Figure 20:
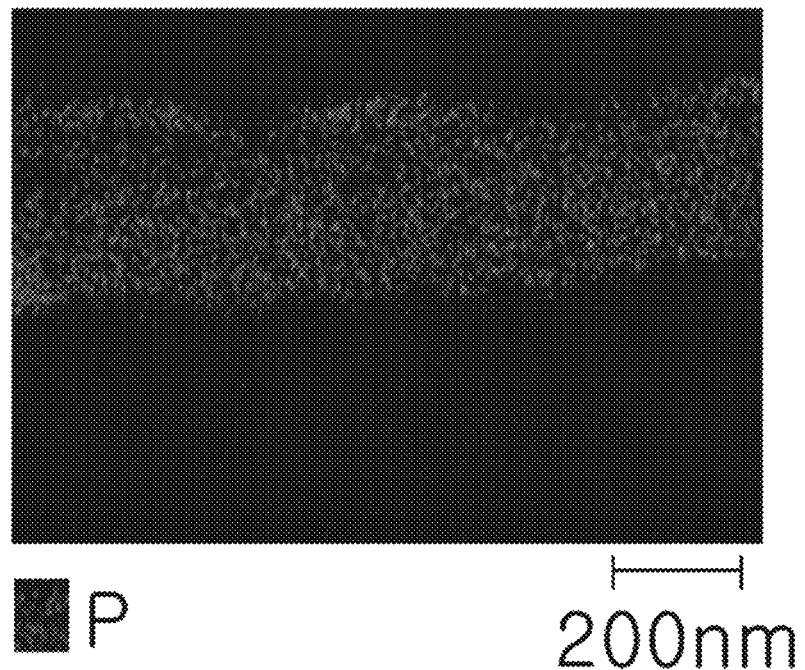
Figure 21:
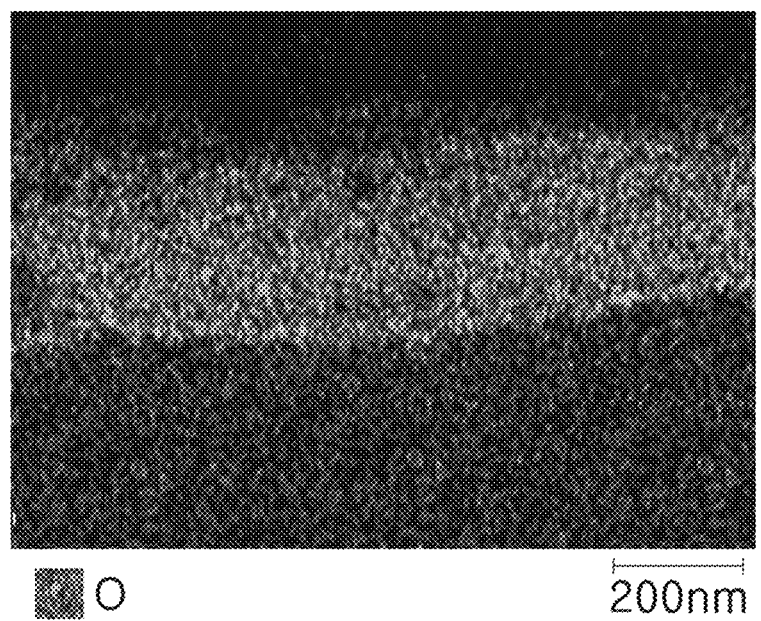
Figure 22:
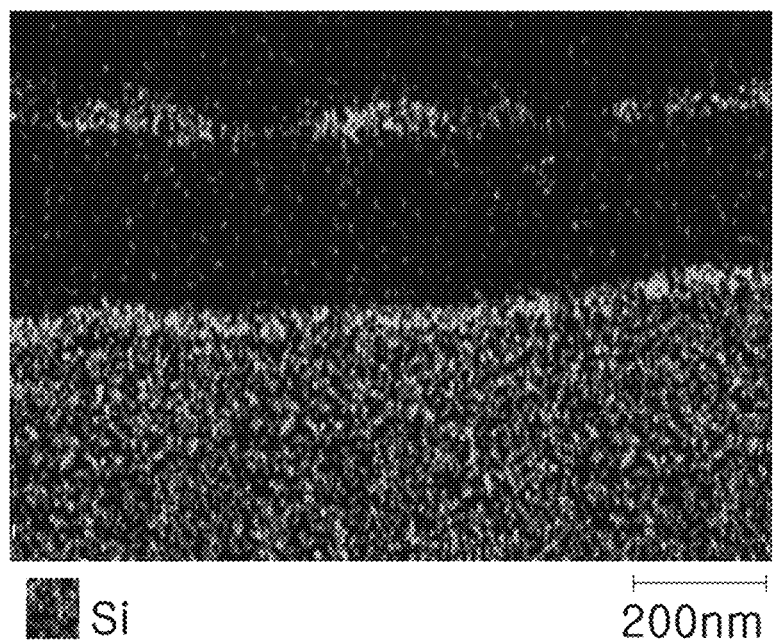
Figure 23:
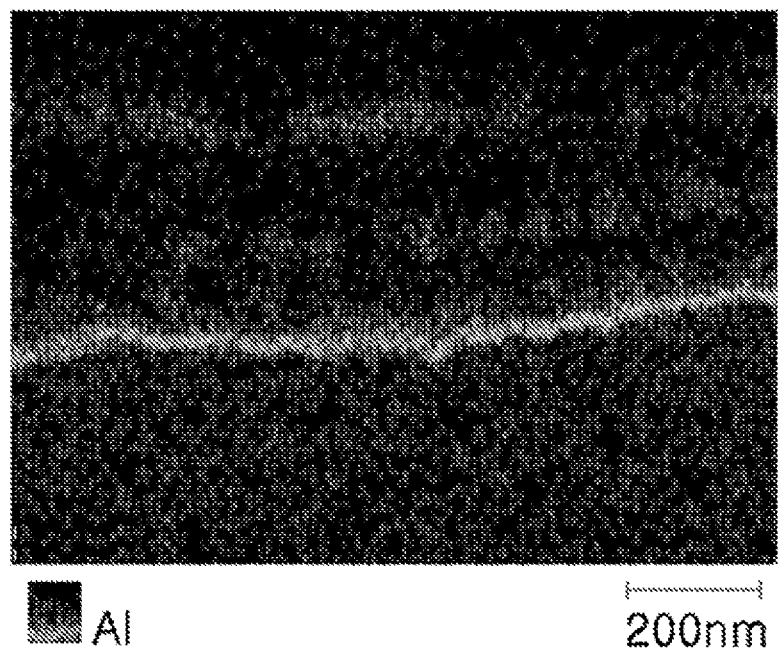

FIG. 11 shows a photograph of a cross-section of an electrical steel sheet product taken by a scanning electron microscope (SEM) and a thickness measured result after stress relief annealing in Example 7. It is determined that an oxidation layer of 205 to 219 nm is formed between the electrical steel sheet and the adhesive layer.

FIG. 12 to FIG. 17 show results of an electron probe microanalysis (EPMA) on a cross-section of an electrical steel sheet product after stress relief annealing in Example 7. It is determined that the elements such as P, Si, C, Fe, K, O, or Al are uniformly dispersed between the adhesive layer and the oxidation layer.

FIG. 18 to FIG. 23 show results of an electron probe microanalysis (EPMA) on a cross-section of an electrical steel sheet product after stress relief annealing in Example 11. It is determined that the elements such as P, Si, C, Fe, K, O, or Al are uniformly dispersed between the adhesive layer and the oxidation layer.

Figure 24:
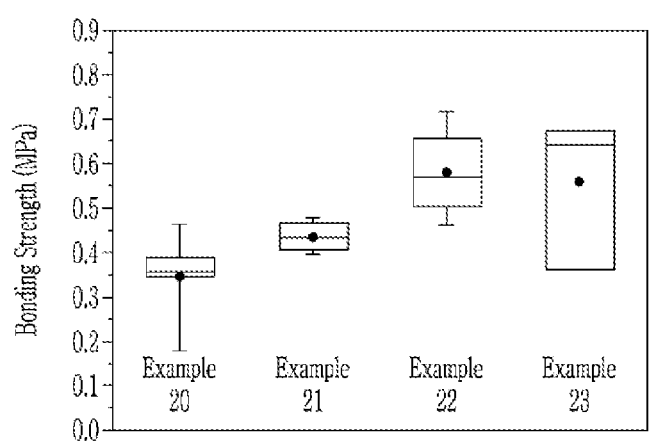
FIG. 24 shows an adherence measured result on an adhesive layer after stress relief annealing in Examples 7, 8, 11, and 12.

FIG. 24 shows an adherence measurement result of an adhesive layer after stress relief annealing in Examples 7, 8, 11, and 12. When stress relief annealing is performed in the modified gas atmosphere, high adherence is measured when stress relief annealing is performed in the nitrogen atmosphere. It is analyzed as that the mixed phosphate and the metal components form a firmer oxidation layer in the adhesive layer by the modified gas atmosphere of weak oxidization to thus improve the adherence.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the embodiments described above are only examples and should not be construed as being limitative in any respects.

<Description of symbols>

| | |
|---|---|
| 100: electrical steel sheet product | 10: electrical steel |
| 20: oxidation layer | 30: adhesive layer |

The invention claimed is:

1. An electrical steel sheet adhesive coating composition comprising,
   with reference to an entire solid of 100 wt %:
   10 to 50 wt % of a resin with a side chain including an aromatic hydrocarbon;
   5 to 40 wt % of an organic/inorganic composite with inorganic nanoparticles substituted for the resin;
   10 to 30 wt % of a composite metal phosphate including at least one of a first aluminum phosphate ($Al(H_2PO_4)_3$), a first cobalt phosphate ($Co(H_2PO_4)_2$), a first calcium phosphate ($Ca(H_2PO_4)_2$), a first zinc phosphate ($Zn(H_2PO_4)_2$), and a first magnesium phosphate ($Mg(H_2PO_4)_2$);
   5 to 50 wt % of phosphoric acid; and
   1 to 15 wt % of a cohesion reinforcing agent including at least one of an oxide, carbon nanotubes (CNT), carbon black, a pigment, and a coupling agent.

2. The electrical steel sheet adhesive coating composition of claim 1, wherein
   the aromatic hydrocarbon includes at least one of benzene, toluene, xylene, naphthalene, anthracene, and benzopyrene.

3. The electrical steel sheet adhesive coating composition of claim 1, wherein
   the resin includes at least one of an epoxy-based resin, a siloxane-based resin, an acryl-based resin, a phenol-based resin, a styrene-based resin, a vinyl-based resin, an ethylene-based resin, and a urethane-based resin.

4. The electrical steel sheet adhesive coating composition of claim 1, wherein
   the resin has a weight average molecular weight of 1000 to 100,000 and a softening point (Tg) of 30 to 150° C.

5. The electrical steel sheet adhesive coating composition of claim 1, wherein
   the inorganic nanoparticles include at least one of Sift, $Al_2O_3$, $TiO_2$, $MgO$, $ZnO$, $CaO$, and $ZrO_2$.

6. The electrical steel sheet adhesive coating composition of claim 1, wherein
   the inorganic nanoparticles are substituted in the organic/inorganic composite at 10 to 50 wt %.

7. An electrical steel sheet laminate comprising:
   a plurality of electrical steel sheets; and
   a thermal fusion layer provided between the plurality of electrical steel sheets,
   wherein the thermal fusion layer includes:
   10 to 50 wt % of a resin with a side chain including an aromatic hydrocarbon,
   5 to 40 wt % of an organic/inorganic composite with inorganic nanoparticles substituted to the resin,
   10 to 30 wt % of a composite metal phosphate including at least one of a first aluminum phosphate ($Al(H_2PO_4)_3$), a first cobalt phosphate ($Co(H_2PO_4)_2$), a first calcium phosphate ($Ca(H_2PO_4)_2$), a first zinc phosphate ($Zn(H_2PO_4)_2$), and a first magnesium phosphate ($Mg(H_2PO_4)_2$),
   5 to 50 wt % of a phosphoric acid, and
   1 to 15 wt % of a cohesion reinforcing agent including at least one of an oxide, carbon nanotubes (CNT), carbon black, a pigment, and a coupling agent.

* * * * *